Aug. 3, 1943.     G. A. JOHNSON     2,325,609
TRAILER
Filed Oct. 2, 1942
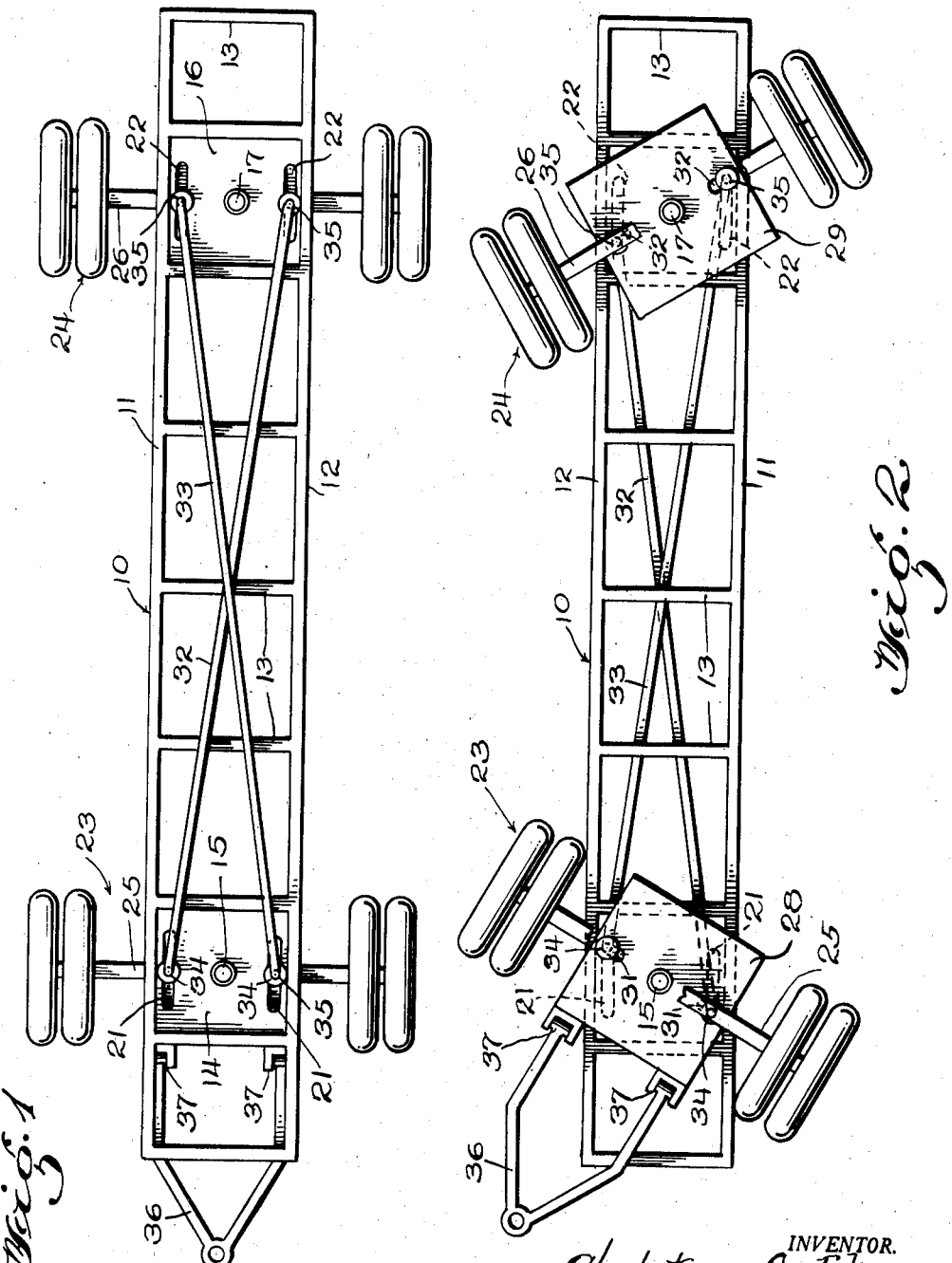
INVENTOR.
Gladstone A. Johnson
BY
L. F. Hammand
ATTORNEY Patented Aug. 3, 1943

2,325,609

UNITED STATES PATENT OFFICE 2,325,609

TRAILER

Gladstone A. Johnson, United States Army,
Tuolumne, Calif.

Application October 2, 1942, Serial No. 460,473

4 Claims. (Cl. 280—91)

(Granted under the act of March 3, 1883, as
amended April 30, 1928; 370 O. G. 757)

The invention described herein, if patented, may be manufactured and used by or for the Government for governmental purposes, without the payment to me of any royalty thereon.

The present invention relates to trailers, and more specifically to steering devices for simultaneously steering the front and rear wheels of a trailer, so that several of the vehicles may be coupled together in a trailer chain, arranged so that each vehicle will accurately follow the exact path of the one before it.

It is recognized that in the prior art it has been more or less customary to provide trucks for the front and rear axles mounted on vertical kingpins and provided with cross reach links so that as the forward axle and wheels are steered, the rear axle and wheels will be moved in the opposite direction, with the result that the rear wheels of the trailer will follow the approximate path of the front wheels.

It is submitted, however, that all of the devices known to the prior art have had certain inherent disadvantages which render them more or less unsatisfactory in actual service; for example, certain of the prior art devices have been so constructed that the rear wheels of the trailer did not exactly follow the path of the front wheels, by reason of the fact that, although the rear axle was pivoted in the direction opposite to the angular inclination of the front wheels, the angle of the rear axle has not been equal to the angular inclination of the forward angle throughout the entire range of their movement.

In other devices of the prior art, imperfect operation has resulted from devices having lost motion connections between the front and rear axles, which in turn resulted in wheel shimmy, looseness, uncertain steering control and wander of the vehicle within the limits of the lost motion devices.

It is, therefore, a principal object of the present invention to provide a trailer vehicle, including front and rear steering trucks, each truck including a transverse axle. The trucks are interconnected by cross reach links arranged to steer the opposite end pairs of wheels simultaneously and maintain the front and rear axles in equal angular relationship to the frame of a trailer throughout the full range of steering movement.

A further object of the invention resides in the provision of a trailer having pivoted front and rear steering trucks interconnected by cross reach bars arranged to positively control the angular position of axles mounted on the trucks, and characterized by absence of any lost motion connections or yieldable spring devices, which in the prior art devices have caused looseness leading to wandering of the wheels.

A further object of the present invention resides in the provision of a trailer having front and rear steering axles operatively interconnected by cross reach bars, the structure being characterized by bearings for the cross reach bars shiftable in a straight line direction only, and provided with straight longitudinal guides on the opposite sides of the kingpin of the axle.

A further object of the invention resides in the provision of a trailer frame having front and rear steering trucks connected by cross reach bars and characterized by the combination of longitudinal guides for the ends of the cross reach bars, and radial guides for the bars associated with the trucks.

Referring now more particularly to the drawing attached to and forming a part of the present specification;

Fig. 1 is a top plan view of a trailer constructed in accordance with the teachings of this invention, the trailer wheels being shown in straight line position.

Fig. 2 is a bottom plan view of the trailer illustrated in Fig. 1, the wheels being shown in their position of maximum angular relationship with respect to the frame.

The trailer frame 10 may be of any conventional structure, but is illustrated as including longitudinal side rails 11 and 12, joined by a plurality of cross frame members 13.

The forward end of the trailer frame is provided with a flat mounting plate 14 in which the front kingpin 15 is secured, and the rearward end of the trailer is provided with a similar mounting plate 16, in which the rear kingpin 17 is fixed. It will be noted that the kingpins 15 and 17 may be rigidly fixed in the plates 14 and 16, respectively, if desired, or they may be pivoted in suitable bearings in these plates, but in either event the pins 15 and 17 will be mounted a fixed and constant distance apart from each other.

The plates 14 and 16 are each provided with a pair of longitudinal guide slots 21 and 22, respectively, which are preferably located at equal distances on either side of the pins 15 and 17, and extend in a straight line longitudinally of the trailer frame.

The running gear of the trailer comprises a front steering truck assembly generally indicated at 23, and a rear steering truck assembly generally indicated at 24, each of the assemblies consisting of a pair of double-tired wheels rotatably mounted on one of the straight cross axle shafts 25 or 26, and arranged to support a rotatable bearing plate 28 or 29 through the medium of suitable spring structures (not shown). The rotatable bearing plates 28 and 29 are mounted on the kingpins 15 and 17, respectively, and each of the plates is provided with short slots 31 or 32, in line with the axle and arranged to intersect the longitudinal guide slots 21 and 22, respectively, in the plates 14 or 16, respectively. The slots 31 extend in a radial direction with respect to the kingpins 15 and 17.

The forward and rear truck assemblies 23 and 24 are operatively interconnected by a pair of cross reach links 32 and 33, each of which has a forward vertical bearing portion 34 at its front end, and a rear bearing portion 35 at its rear end, the arrangement being such that of the forward vertical bearing portions 34 of the cross reach links extend through the slots 21 in the plate 14, and also through the radial slots 31 in the shiftable plate 28. Similarly, the rear bearings 35 extend through the slots 22 in the rear plate 16, and through the radial slots 32 in the shiftable plate 29.

The forward truck is provided with a drawbar 36 pivotally interconnected with the plate 28 at the points 37. The operation of the device is as follows:

The trailer is drawn forward by means of a prime mover which engages the drawbar 36 so that when the prime mover deviates from straight line motion, the drawbar will be swung to one side or the other to pivot the front truck around the kingpin 15 and thus cause the trailer to follow directly behind the prime mover. As this occurs, the movement of the front axle assembly 23, and more particularly of the plate 28, will shift the cross reach links 32 and 33 longitudinally to pivot the rear truck 24 in an equal and opposite direction with respect to the inclination of the front wheels. In this connection it should be particularly noted that the bearings 34 and 35 of the cross reach bars do not swing in an arcuate path around the kingpins, but move in the guide slots 21 and 22, respectively, so that they move directly forward or back in a straight line path of movement.

It should also be noted that although the bearings 34 and 35 extend through slots in the plates 28 and 29, respectively, no lost motion is possible between the forward and rear truck assemblies, since the intersection of the radial slots 31 and 32, and the longitudinal guide slots 21 and 22, respectively, are at such an angle that the operating connection between the front and rear wheels is entirely positive at all times.

From the foregoing it will be apparent that the teachings of the present invention provide a novel and improved trailer structure wherein the disadvantages of the prior devices are overcome, particularly by virtue of the fact that the forward and rear trucks of the present device are positively interconnected as distinguished from connections including lost motion devices or resilient centering mechanisms. Further, the present invention provides a front and rear axle alignment control whereby the front and rear axles are maintained at exactly the same angle throughout an entire range of steering movement, so that the rear wheels of the trailer will exactly follow the path of the front wheels.

Having thus described my invention, what I claim as new and desire to secure by Letters Patent is:

1. In a trailer, in combination, a frame including longitudinal beams and transverse beams, together with a forward truck bearing plate supporting a vertical kingpin, and a rear truck bearing plate supporting a vertical kingpin; a front steering truck and a rear steering truck, each of said trucks including a straight rigid transverse axle having wheels rotatably mounted on each of its ends; a pair of cross reach links extending from one side of the forward truck to the opposite side of the rear truck; bearing surfaces connecting the cross reach links with the forward and rear trucks, respectively; the structure being characterized by reach link bearings shiftable in a straight line path of movement extending longitudinally on each side of the kingpins of said frame and provided with straight longitudinal guide members associated with the frame, the bearings also being shiftable with respect to the trucks in a direction radial of the kingpins, and provided with front and rear radial guides.

2. In a trailer, in combination, a frame, together with a forward vertical kingpin, and a rear vertical kingpin; a front steering truck and a rear steering truck, each of said trucks being mounted on one of said kingpins and including a straight rigid transverse axle having wheels rotatably mounted on each of its ends; a pair of cross reach links extending from one side of the forward truck to the opposite side of the rear truck; bearing surfaces connecting the cross reach links with the forward and rear trucks, respectively; the structure being characterized by reach link bearings shiftable in a straight line path of movement extending longitudinally on each side of the kingpins, and provided with straight longitudinal guide members associated with the frame.

3. In a trailer, in combination, a frame, together with a forward truck and a rear truck, each of said trucks including a straight rigid transverse axle having wheels rotatably mounted on each of its ends; a pair of cross reach links extending from one side of the forward truck to the opposite side of the rear truck; bearing surfaces connecting the cross reach links with the forward and rear trucks, respectively; the structure being characterized by reach link bearings shiftable in a straight line path of movement extending longitudinally on each side of said frame and provided with straight longitudinal guide members associated with the frame, the bearings also being shiftable with respect to the trucks, and provided with front and rear guides lying above and in the plane of the forward and rear axles, respectively.

4. In a trailer, in combination, a frame, together with a forward truck and a rear truck, each of said trucks having wheels rotatably mounted on each of its sides; a pair of cross reach links extending from one side of the forward truck to the opposite side of the rear truck; bearing surfaces connecting the cross reach links with the forward and rear trucks, respectively; the structure being characterized by straight longitudinal guide members associated with the frame, and lying above the forward and rear axles, respectively.

GLADSTONE A. JOHNSON.